Dec. 31, 1968     R. CONRAD     3,419,293

TUBE COUPLING

Filed March 6, 1967

INVENTOR,
ROBERT CONRAD;
BY
Calvin Brown,
ATTORNEY

United States Patent Office 3,419,293
Patented Dec. 31, 1968

3,419,293
TUBE COUPLING
Robert Conrad, 1531 N. Rose St.,
Burbank, Calif. 91505
Filed Mar. 6, 1967, Ser. No. 620,880
1 Claim. (Cl. 287—58)

ABSTRACT OF THE DISCLOSURE

The present device is for locking telescopic tubes in relative positions of extension. In its simplest embodiment, two telescopic tubes are contemplated, the inner of said tubes carrying a cylindrical plug having an eccentric hub portion surrounded by a curved groove. A collet or split collar formed of suitable material such as nylon surrounds the hub. The collet or split collar has the same eccentricity as the eccentricity of the hub portion of the plug and the collet or split collar is formed to have two friction shoes joined at one end by a thin web, the opposite ends being separable. When either telescopic tube is rotated clockwise or counterclockwise relative to the other tube, one of the shoes of the collet is moved into engagement with the other tube to lock the two tubes in adjusted position, the collet being held against axial movement by being confined in the curved groove.

---

An object of the invention is to provide a locking tube coupling for telescopic tubes whereby the tubes may be locked in position of adjustment as to length, easily, smoothly and without any slippage after adjustment.

A further object is to provide a tube coupling so formed and constructed as to provide positive locking of the tubes in position of adjustment and which permits easy hand release of the tubes for further adjustment.

A further object is the provision of the locking type coupling for a pair of telescopic tubes which permits communication through the tubes.

A further object is an adjustable type tube coupling for telescopic tubes which is adaptable for many uses and purposes, such as for swimming pool brushes, for the cleaning of ceilings, window cleaning and for other uses.

Figure 5:
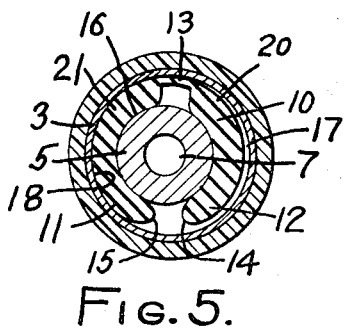
FIGURE 5 is a sectional view on the line 5—5 of FIGURE 2, the locking tube collet or split collar being in locking engagement with the outer tube.
Figure 6:
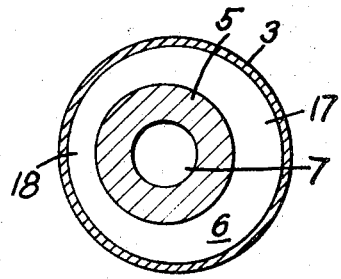
FIGURE 6 is an enlarged, sectional view showing the eccentricity of the eccentric portion of the plug relative to the axis of the concentric tubes.
Figure 7:
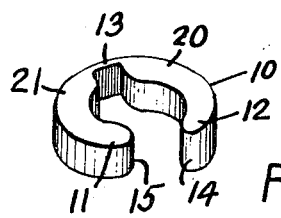
FIGURE 7 is a perspective view of a split collar used in the present invention.

Referring now to the drawing, the locking tube coupling shown in FIGURES 2 to 7 inclusive, includes a substantially cylindrical plug 1 adapted to be fitted within one end of a tube 2, the tube 2 being telescoped within tube 3. Tube 2 in the present instance, is known as the inner tube and 3 the outer tube. The plug is fitted within tube 2 in any convenient manner so as to be held within the tube and not to turn independently of the tube 2, if the tube 2 is rotated. The plug 1 is provided with a shoulder 4 the external diameter of which is the same as the external diameter of tube 2. Formed on the plug is a hub 5 which is eccentric relative to the axis of the tube 2 and the plug portion 1a of plug 1. Depending from the hub 5 is a flange 6 having a diameter sufficient to allow it to be received within a tube 3 and turnable relative to the tube 3. The hub 5, shoulder 4 and flange 6 defines a circular groove 6a. Both the plug portion 1a, the hub 5 and the flange 6 are provided with a through bore such as illustrated in FIGURES 5 and 6 at 7. This bore allows circulation between the tubes 2 and 3. Interposed between the shoulder 4 and the flange 6 within groove 6a, and carried on the hub 5 is a collet or split collar 10. The collet or split collar provides two like arcuate shoes 11 and 12 which are joined at 13 by a thin web. Both shoes taper as to thickness from the web 13 to the ends 14 and 15 of the shoes, which ends are separated. The tapering of the shoes provides an exterior eccentric surface relative to the normal bore between the two shoes, as shown at 16. The eccentricity of the collet or split collar is the same as the eccentricity of the hub 5, so that when the collet or split collar is upon the hub and the plug 1 is rotated, the collet or split collar will assume a concentricity relative to the hub and the axis of tube 3, as shown in the position therefor in FIGURE 3. Thus, as shown in FIGURE 6, the eccentric hub is spaced further from the interior surface of the tube 3 at 17 than at the position diametrically opposite at 17. When the collet or split collar is carried on the hub, as shown in FIGURE 5, a portion of the collet or split collar at 20 and 21 has a width which would normally fill the space at 17 with the tapered ends 14 and 15 received within the space 18. The ends 14 and 15 may be rounded as shown in FIGURES 5 and 7, and the collet or split collar may be formed of any suitable friction material which may be nylon, leather.

Figure 1:
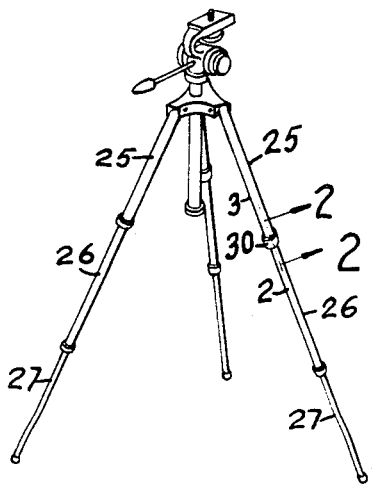
FIGURE 1 is a perspective view of a tripod for cameras and the like, the tripod legs being held in adjustment by means of the locking coupling detailed in the remaining figures.
Figure 2:
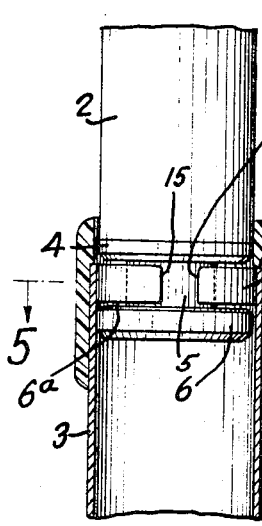
FIGURE 2 is a fragmentary, partially sectional view, on an enlarged scale, taken on the line 2—2 of FIGURE 1, the locking tube coupling being in locked position.
Figure 3:
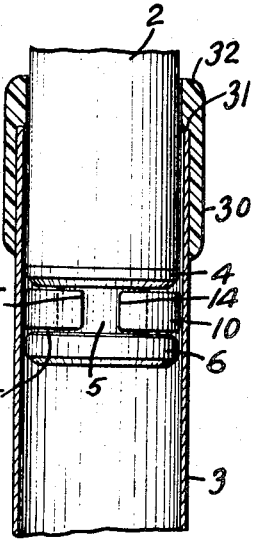
FIGURE 3 is a fragmentary, sectional view similar to that of FIGURE 2, the locking tube coupling being in released position.
Figure 4:
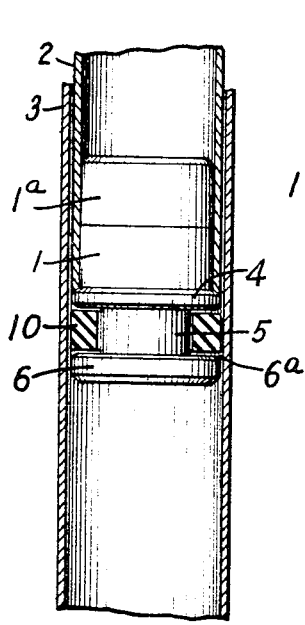
FIGURE 4 is a fragmentary, partially sectional view, showing two telescopic tubes, the locking tube coupling being released to allow relative tube movement.

In FIGURE 1 I have shown an adaptation of the invention wherein a tripod for a camera is provided, the legs of the tripod embodying the invention just described, there being three tube sections for each leg as shown at 25, 26 and 27, for one of the legs, the other legs being identical with locking type couplings carried by the leg sections 25 and 26 for adjustment of the length of each leg. Other adaptations and uses of the invention will occur to those having need for telescopic tubes which may be locked together. The tube 3, as shown in FIGURES 2 and 3, carries an external collar 30 which collar is provided with an internal annular shoulder at 31 which bears against an end of the tube 3, the collar being annularly enlarged at 32 to fit closely against the outer surface of tube 2. This construction aids in guiding movement of and stabilizing the two tubes as they are telescoped, as shown for instance in FIGURE 3.

The operation, uses and advantages of the invention are as follows.

The main factor in the present invention is the use of a locking type coupling for telescopic tubes which is positive in its action and allows a smooth operation in the telescoping of the tubes and a locking of the tubes together in positions of extension and retraction. In FIGURE 2 the tubes are in locked position and FIGURE 5 shows an action of the locking type coupling for securing the tubes in locked position. Thus, if tube 2 is rotated relative to tube 3, the eccentric hub 5 of the plug 1 will rotate to move the eccentric outer surface of one of the shoes; to wit, shoe 11, into engagement with the tube 3 while the other tube is slightly spaced from web 13 to end 14 from the interior of the tube. If tube 2 is rotated in the opposite direction from the direction just mentioned, the shoe 10 would move into engagement with tube 3 and shoe 11 would assume the position of slight spacing from the interior of the tube 3. Hence, when assembling the tubes with the locking type couplings, in order to insert one tube within the other, it is essential that the collet or split collar be rotated upon the eccentric hub so that the exterior surface of the collet or split collar is concentric with the tube. Usually telescopic tubes such as shown at 2 and 3 are formed of aluminum or aluminum alloy and the same may be true for the plug 1. It is preferable that the plug 1 should have the portion 1a slightly tapered on its exterior surface so as to be readily received within the tube 2 and secured in any suitable manner to said tube. The shoulder 4 will limit movement of the plug portion 1a within the tube 2 and the shoulder has a diameter substantially equal to the diameter of tube 2. It is preferable that the eccentric hub 5 have a smooth exterior surface so that the collet or split collar will freely move when the plug is rotated. As previously pointed out, the eccentricity of the collet or split collar is substantially the same as the eccentricity of the hub whereby when the collet and hub are assembled the collet or collar may be rotated on the hub so that the exterior surface of said collet or collar presents a concentric outer surface to the interior of the tube 3. This allows for easy assembly of the different telescopic tubes and upon holding one or the other tube 2 or 3 and turning one of said tubes relative to the other tube, the eccentric hub will move the collet or collar into engagement with the exterior tube and this engagement may vary as to pressure depending upon the degree of relative turning of the two tubes. One or the other of the shoes of the collet or collar will be slightly spaced from the interior of tube 3 as shown in FIGURE 5, so that ready release of the collet or collar from tight engagement within the tube may be obtained for further adjustment as to length of the telescoping tubes.

Axial movement of the collet is restrained by the shoulder 4 and flange 6 when the hub 5 is rotated by tube 2.

I claim:
1. A locking device for a pair of telescopic tubes, including: a plug fitted within the end of the innermost of said telescopic tubes and immovably attached thereto, the plug provided with an axially extending hub eccentric to the axis of the plug, and a collar split on a diameter forming thereby two opposed, generally crescent-shaped, non-metallic shoes, the complete outer periphery thereof forming a smooth, continuous curve slightly smaller in diameter than the inner diameter of the outer tube; the inner opposed surfaces of the shoes defining a cavity eccentric to the axis of the collar and positioned loosely about the eccentric hub surrounding said hub having an eccentric outer surface, the eccentricity of the collar being substantially the same as the eccentricity of the hub relative to the axis of the plug; said split collar forming two shoes being joined at their radially outer peripheries by a thin web, and ends of said shoes opposite the hub being separated, both shoes having their greater radial width at the point of joinder with the web and tapering from the greatest width portion to the separated ends to provide the eccentric outer surface whereby, when the eccentric hub is rotated relative to the collar one of the shoes is pressed into frictional contact with the outer tube and the other shoe is radially spaced from such tube thereby releasably holding the tubes in a selected position with the spacing between the said other shoe and the outer tube providing space for complete disengagement of the collar from the outer tube upon rotation of the hub in the release direction, thereby also providing for free telescopic adjustment of the telescopic tubes.

References Cited
UNITED STATES PATENTS

| | | | |
|---|---|---|---|
| 2,459,785 | 1/1949 | Allerton | 287—136 |
| 2,473,351 | 6/1949 | Thompson et al. | 287—136 |
| 2,526,415 | 10/1950 | Refsdal | 287—136 |

FOREIGN PATENTS 101,204  10/1925  Austria.

WAYNE L. SHEDD, *Primary Examiner.*

C. W. TOMLIN, *Assistant Examiner.*

U.S. Cl. X.R.

287—126; 285—302